United States Patent
Itkin et al.

(10) Patent No.: US 10,404,530 B2
(45) Date of Patent: Sep. 3, 2019

(54) CONFIGURABLE AEN NOTIFICATION

(71) Applicant: Mellanox Technologies Ltd., Yokneam (IL)

(72) Inventors: Yuval Itkin, Zoran (IL); Dror Goldenberg, Zichron Yaakov (IL)

(73) Assignee: Mellanox Technologes, Ltd., Yokneam (IL)

( * ) Notice: Subject to any disclaimer, the term of this patent is extended or adjusted under 35 U.S.C. 154(b) by 315 days.

(21) Appl. No.: 14/534,207

(22) Filed: Nov. 6, 2014

(65) Prior Publication Data

US 2015/0124649 A1  May 7, 2015

Related U.S. Application Data

(60) Provisional application No. 61/901,024, filed on Nov. 7, 2013.

(51) Int. Cl.
*H04L 12/24* (2006.01)
*G06F 13/38* (2006.01)
*G06F 3/06* (2006.01)

(52) U.S. Cl.
CPC ........ *H04L 41/0803* (2013.01); *G06F 13/385* (2013.01); *G06F 3/06* (2013.01)

(58) Field of Classification Search
CPC ... H04L 41/0803; H04L 69/18; G06F 13/385; G06F 3/06
See application file for complete search history.

(56) References Cited

U.S. PATENT DOCUMENTS

| | | | |
|---|---|---|---|
| 7,457,887 B1 | 11/2008 | Winkle | |
| 8,631,284 B2 | 1/2014 | Stevens | |
| 2006/0190764 A1* | 8/2006 | Maharana | H04L 12/40182 714/4.1 |
| 2008/0005311 A1 | 1/2008 | Ali | |
| 2010/0057966 A1* | 3/2010 | Ambikapathy | G06F 13/24 710/260 |
| 2010/0164300 A1* | 7/2010 | Takezaki | H04W 52/0229 307/116 |
| 2010/0317346 A1* | 12/2010 | Ali | H04W 36/0061 455/436 |
| 2011/0239196 A1* | 9/2011 | Ichard | G06F 11/3636 717/127 |
| 2011/0271151 A1* | 11/2011 | Stevens | G06F 11/0745 714/50 |

(Continued)

OTHER PUBLICATIONS

Distributed Management Task Force, Inc. Document No. DSP0222 Date: Jul. 21, 2009, Version: 1.0.0.*

(Continued)

*Primary Examiner* — Walter J Divito
*Assistant Examiner* — Anthony Luo
(74) *Attorney, Agent, or Firm* — Kligler & Associates (57) ABSTRACT

Computerized methods and systems are disclosed for configuring a network controller (NC). These methods and systems recognize, via a network device, e.g., hardware, software, processors, storage media, memory, a predetermined command from a management controller (MC). The network device responds to the predetermined command by configuring the NC with a message type associated with an event, and controlling enablement of a message associated with the message type using a selectable enable bit as defined in the predetermined command.

8 Claims, 8 Drawing Sheets

(56) References Cited

U.S. PATENT DOCUMENTS

2012/0243457 A1* 9/2012 Narasimhan ......... H04L 12/189
370/312

OTHER PUBLICATIONS

Single/Dual-Port Adapter' cards supporting up to 40Clb/s InfiniBarid, Mellanox Product Brief published 2011, www.mellanox.com/page/products_dyn?product_family=4.

DMTF Document No. DSP0222 2 Date: Jan. 24, 2013 Version: 1.0.1; "Network Controller Sideband Interface (NC-SI) 5 Specification", www.dmtf.org/sites/default/files/standards/documents/DSP0222_1.0.1.pdf.

* cited by examiner

| | 31:24 | 23:16 | 15:08 | 07:00 |
|---|---|---|---|---|
| 0:3 | MC ID | Header Revision | Reserved | IID |
| 4:7 | Control Packet Type=0x50 | Ch ID=0x00 | Reserved | Payload Length |
| 8:11 | Reserved | | | |
| 12:15 | Reserved | | | |
| 16:19 | Mellanox Manufacture ID (IANA) = 0x8119 | | | |
| 20:23 | Command rev | MLNX Cmd ID= 0x12 | Parameter=0x04 | PAD=0x00 |
| 24:27 | Mellanox Package AEN 31:0 = 0x0000 | | | |
| 28:31 | Mellanox Channel AEN 31:0 = 0x0008 | | | |
| 32:35 | AEN_GROUP=0x1 | Reserved | AEN_SEL= 0x2 | AEN_TYPE=0x71 |
| 36:39 | Checksum | | | |

Set Channel 0 AEN for High Current Warning as
Group 0x1
controlled by AEN Control bit 18
AEN Type = 0x71

FIG. 4A

| | 31:24 | 23:16 | 15:08 | 07:00 |
|---|---|---|---|---|
| 0:3 | MC ID | Header Revision | Reserved | IID |
| 4:7 | Control Packet Type=0x50 | Ch ID=0x01 | Reserved | Payload Length |
| 8:11 | Reserved | | | |
| 12:15 | Reserved | | | |
| 16:19 | Mellanox Manufacture ID (IANA) = 0x8119 | | | |
| 20:23 | Command rev | MLNX Cmd ID= 0x12 | Parameter=0x04 | PAD=0x00 |
| 24:27 | Mellanox Package AEN 31:0 = 0x0000 | | | |
| 28:31 | Mellanox Channel AEN 31:0 = 0x0008 | | | |
| 32:35 | AEN_GROUP=0x2 | Reserved | AEN_SEL= 0x3 | AEN_TYPE=0x72 |
| 36:39 | Checksum | | | |

Set Channel 1 AEN for High Current Warning as
Group 0x2
controlled by AEN Control bit 19
AEN Type = 0x72

FIG. 4B

| | 31..24 | 23..16 | 15..08 | 07..00 |
|---|---|---|---|---|
| 0..3 | MC ID | Header Revision | Reserved | IID |
| 4..7 | Control Packet Type=0x50 | Ch. ID=0x1F | Reserved | Payload Length |
| 8..11 | Reserved ||||
| 12..15 | Reserved ||||
| 16..19 | Mellanox Manufacture ID (IANA) = 0x8119 ||||
| 20..23 | Command rev | MLNX Cmd ID= 0x12 | Parameter=0x04 | PAD=0x00 |
| 24..27 | Mellanox Package AEN 31:0 = 0x0001 ||||
| 28..31 | Mellanox Channel AEN 31:0 = 0x0000 ||||
| 32..35 | AEN_GROUP=0x0 | Reserved | AEN_SEL= 0x1 | AEN_TYPE=0x70 |
| 36..39 | Checksum ||||

Set Package AEN for Thermal Warning as Group 0x0 controlled by AEN Control bit 17 As AEN Type = 0x70

FIG. 4C

|  | 31:24 | 23:16 | 15:08 | 07:00 |
|---|---|---|---|---|
| 0_3 | MC ID | Header Revision | Reserved | IID |
| 4_7 | Control Packet Type=0x08 | Ch. ID=0x00 | Reeserved | Payload Length |
| 8_11 | Reserved ||||
| 12_15 | Reserved ||||
| 16_19 | Reserved ||| AEN MCID |
| 20_23 | AEN Control = 0x00040000 ||||
| 24_27 | Checksum ||||

Enable Channel 0 AEN message

FIG. 4D

|  | 31:24 | 23:16 | 15:08 | 07:00 |
|---|---|---|---|---|
| 0_3 | MC ID | Header Revision | Reserved | IID |
| 4_7 | Control Packet Type=0x08 | Ch. ID=0x01 | Reeserved | Payload Length |
| 8_11 | Reserved ||||
| 12_15 | Reserved ||||
| 16_19 | Reserved ||| AEN MCID |
| 20_23 | AEN Control = 0x00080000 ||||
| 24_27 | Checksum ||||

Enable Channel 1 AEN message

FIG. 4E

|  | 31:24 | 23:16 | 15:08 | 07:00 |
|---|---|---|---|---|
| 0_3 | MC ID | Header Revision | Reserved | IID |
| 4_7 | Control Packet Type=0x08 | Ch. ID=0x1F | Reeserved | Payload Length |
| 8_11 | Reserved ||||
| 12_15 | Reserved ||||
| 16_19 | Reserved ||| AEN MCID |
| 20_23 | AEN Control = 0x00020000 ||||
| 24_27 | Checksum ||||

Enable Package AEN message

| BYTE\BITS | 7:0 | 15:08 | 23:16 | 31:24 |
|---|---|---|---|---|
| 0:15 | NC-SI Header (OEM Command) | | | |
| 16:19 | Mellanox Manufacture ID (IANA)=0x8119 | | | |
| 20:23 | Command rev | MLNX Cmd ID=0x13 | Parameter=0x04 | PAD=0x00 |
| 24:27 | AEN_GROUP | Reserved | | |
| 28:31 | Checksum 31:0 | | | |

FIG. 6

| BYTE\BITS | 7:0 | 15:08 | 23:16 | 31:24 |
|---|---|---|---|---|
| 0:15 | NC-SI Header (OEM Command) | | | |
| 16:19 | Mellanox Manufacture ID (IANA)=0x8119 | | | |
| 20:23 | Command rev | MLNX Cmd ID=0x13 | Parameter=0x04 | PAD=0x00 |
| 24:27 | Mellanox Package AEN 31:0 | | | |
| 28:31 | Mellanox Channel AEN 31:0 | | | |
| 32:35 | Reserved | | AEN_SEL | AEN_TYPE |
| 36:39 | Checksum 31:0 | | | |

FIG. 7

CONFIGURABLE AEN NOTIFICATION

CROSS-REFERENCES TO RELATED APPLICATIONS

This application is related to and claims priority from commonly owned U.S. Provisional Patent Application Ser. No. 61/901,024, entitled: Configurable AEN Notification, filed Nov. 7, 2013, the disclosure of which is incorporated by reference herein in its entirety.

TECHNICAL FIELD

The present invention is directed to network interface cards which use a sideband interface control protocol.

BACKGROUND

Network Controller Sideband Interfaces are in accordance with the Standard, "DMTF Document Number: DSP0222, Network Controller Sideband Interface (NC-SI) Specification, Version 1.0.1, Distributed Management Task Force, Inc. (DMTF), Jan. 24, 2013", this document incorporated by reference in its entirety herein, hereinafter known as "the DMTF DSP0222 Standard", provides for Network Controller devices to add additional events to those which are already includes in the DMTF DSP0222 Standard. The DMTF DSP0222 Standard allocated a range of enable control bits within the standard commands and a range of message types was allocated to allow more events to be added, in addition to the events defined in the NC-SI standard.

Presently, the DMTF DSP0222 Standard is such that multiple vendors of multiple devices may be using the same enable control bits and/or the same message types for different messages. This results in situations where the same notification and event type is subject to different interpretations when the message originates from devices of different vendors. Also, the same notification enable bits can control different message types.

As an attempt to resolve this potential problematic situation, server management controllers in a platform that uses multiple devices from different vendors, lookup mechanisms were used to convert notifications according to the device vendor. This lookup mechanism complicated management controller operations, as it added processing complexity and time, according to the device vendor. However, without a lookup mechanism, the management controller was unable to correctly interpret various events. This prevented certain combinations of devices from different vendors to be used in some systems.

SUMMARY

The present invention works within the NC-SI Standard, and provides methods and systems for preventing devices of different vendors from using the same enable bits and/or the same message type(s) for different messages. In accordance with the present invention, the enable bits can be remapped in the network controller and coordinated with those in the management controller, so that multiple vendors of different devices use different enable bits, each enable bit for its own message type for assigned messages.

Embodiments of the present invention are directed to computerized methods and systems for configuring network controllers (NCs). These methods and systems recognize, via a network device, e.g., hardware, software, processors, storage media, memory, a predetermined command from a management controller (MC). The network device responds to the predetermined command by configuring the NC with a message type associated with an event, and controlling enablement of a message associated with the message type using a selectable enable bit as defined in the predetermined command.

Embodiments of the present invention are directed to a computerized method for configuring a network controller (NC). The method comprises: recognizing, by a network device, a predetermined command from a management controller (MC); and, the network device responding to the predetermined command by configuring the NC with a message type associated with an event, and controlling enablement of a message associated with the message type using a selectable enable bit as defined in the predetermined command.

Optionally, the message type is an Asynchronous Event Notification (AEN) type.

Optionally, the event is defined by a bit mask to associate an event type with a configurable AEN Type.

Optionally, the bit mask includes the fields for a package AEN and a channel AEN associated with the respective package and channels of the NC.

Optionally, the AEN Type is in accordance with the DMTF DSP0222 standard.

Optionally, the AEN Type is specific to the vendor of the NC.

Optionally, the enable bit includes an AEN enable control bit.

Optionally, the network device is associated with the NC and includes one or more of hardware, software, processors, storage media, and memory.

Optionally, the network device responds to the predetermined command by configuring the transmission of an NC-to-MC message carrying the message type dictated by the predetermined message upon occurrence of an associated event dictated by the predetermined message.

Optionally, the method additionally comprises: recognizing, by the network device, after processing of the first predetermined command, a second predetermined command from a management controller (MC); and the NC responding to the predetermined command by enabling or disabling transmission of the NC-to-MC message type defined in the first predetermined command according to a selectable enable bit as defined in second predetermined command.

Optionally, the network device is associate with the NC includes one or more of hardware, software, processors, storage media, and memory.

Embodiments of the present invention are also directed to network controllers (NCs). These network controllers each comprise: a network device configured for 1) recognizing a predetermined command from a management controller (MC); and, 2) responding to the predetermined command by configuring the NC with a message type associated with an event, and controlling enablement of a message associated with the message type using a selectable enable bit as defined in the predetermined command.

Optionally, the network device is configured for handling message types including the Asynchronous Event Notification (AEN) type.

Optionally, the network device includes one or more of hardware, software, processors, storage media, and memory.

Optionally, the AEN Type is in accordance with the DMTF DSP0222 standard.

Optionally, the AEN Type is specific to the vendor of the Network Controller.

Optionally, the network device is configured for handling enable bits including an AEN enable control bit.

Optionally, the network device responding to the predetermined command includes configuring the transmission of an NC-to-MC message carrying the message type dictated by the predetermined message upon occurrence of an associated event dictated by the predetermined message.

Optionally, the network device is additionally configured for recognizing, by the network device, after processing of the first predetermined command, a second predetermined command from a management controller (MC); and the NC responding to the predetermined command by enabling or disabling transmission of the NC-to-MC message type defined in the first predetermined command according to a selectable enable bit as defined in second predetermined command.

Optionally, the network device includes one or more of hardware, software, processors, storage media, and memory.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned.

A server is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

A "client" is an application that runs on a computer, workstation or the like and relies on a server to perform some of its operations or functionality.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

Figure 1:
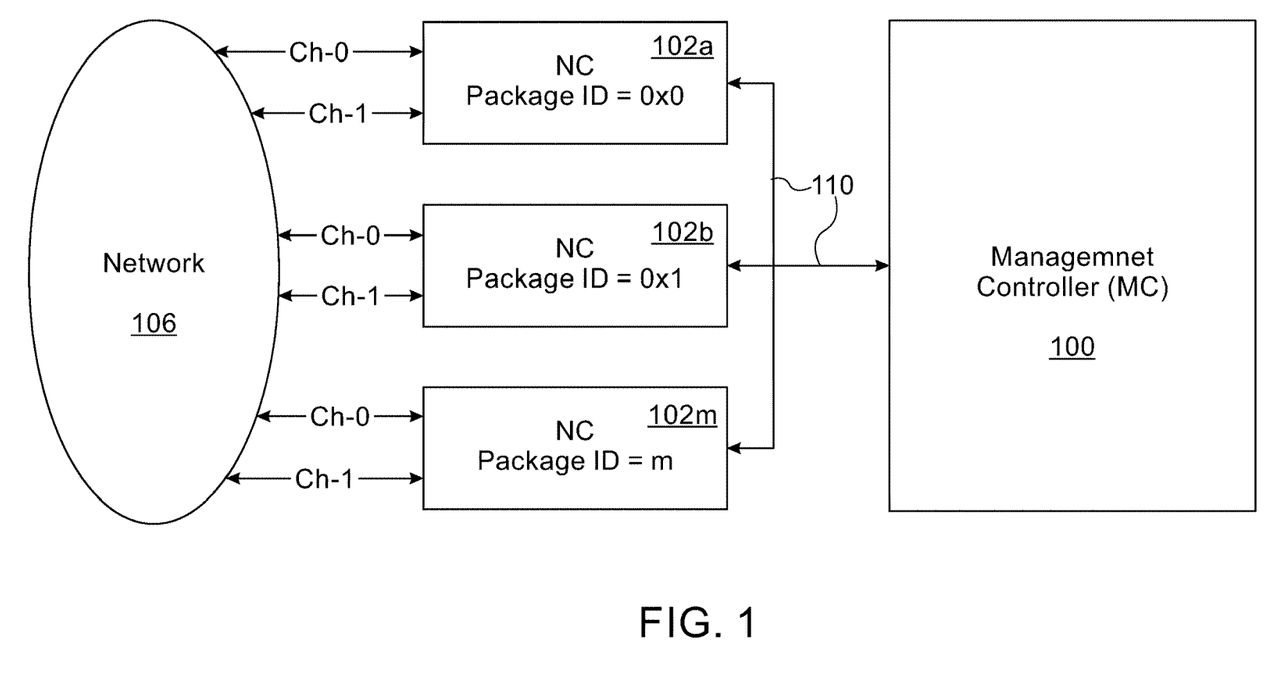
FIG. 1 is a diagram of an exemplary environment for the system in which embodiments of the disclosed subject matter are performed.

FIG. 1 shows an exemplary environment for the present invention. The environment includes a management controller (MC) 100 linked to network controllers (NC) 102a-102m ("m" being the last of a series of variable length), which, in turn, link to a network 106, for example a wide area network (WAN), including, for example, the Internet, a local area network (LAN) or other communications or computer network. The network controllers 102a-102m each include one Package ID, and each network controller 102a-102m has two channels, Channel (Ch 0) and (Ch 1). A Network Controller Sideband Interface (NC-SI) 110, is intermediate the management controller 100 and the network controllers 102a-102m.

Each of the network controllers 102a-102m, is, for example, an adapter card, such as those of the ConnectX® series of adapter cards from Mellanox Technologies of Sunnyvale, Calif. For example, one series of ConnectX® adapter cards is described in ConnectX®—Single/Dual Port Adapter Cards Supporting up to 40 Gb/s InfiniBand Product Brief, © 2011, Mellanox Technologies, the disclosure of which is incorporated by reference herein. The adapter cards of the network controllers 102a-102m include network devices formed by one or more of hardware, software, processor(s) and storage (storage media)/memory for performing operations such as recognizing a command(s) (e.g., predetermined command(s) as the specific command may be embedded or otherwise programmed into the network device) from the management controller (MC) 100, and, responding to the command(s) by the configuring the NC 102a-102m with a message type associated with an event, and controlling enablement of a message associated with the message type using a selectable enable bit as defined in the command(s). The NC-SI 110 is a series of connections, e.g., wires, in accordance with the DMTF DSP0222 Standard. This DMTF DSP0222 standard also defines a special event notification known as Asynchronous Event Notification (AEN).

While the MC 100, NCs' 102 and NCSI 110 are shown as parts of a single server, computer or the like, they may be on multiple servers, computers and the like in any combination.

The Management Controller (MC) 100 configures, via its processors and storage/memory the NCs 102a-102m, in response to the NCs receiving the command from the MC 100, the command, for example, "Set System AEN Controls." This command maps an event notification of the NC 102a-102m to a specific enable control bit, and assigns this enable control bit a configurable message type. This command enables the user to arbitrarily assign any of the allowed enable configuration bits and use any of the allowed AEN type values without restrictions. The flexibility of the new configuration fields in the new OEM (original equipment manufacturer) command assures that a system implementation prevents duplicate configurations from occurring, such as multiple NC 102a through NC 102m devices, such as OEM devices controlled by the respective network controller 102a-102m, these network controllers 102a-102m which report different events using the same AEN type value, provided there are resources available to be used by OEM AEN messages.

The Management Controller (MC) 100 is also configured to add an OEM read command "Get System AEN Controls", which allows the management controller 100 to read the current settings of the event notification message settings in NCs 102a-NC 102m. The network controllers (NC) 102a-102m are designed to receive (and recognize) commands. This OEM read command allows the management controller 100 to check the current settings, whether there are any configuration changes required, and allowing the management controller 100 to configure NC 102a through NC 102m as needed using the "Set System AEN Controls" such that duplicate configurations will not occur and such that any event notification is uniquely configured to a designated event type.

Figure 2A:
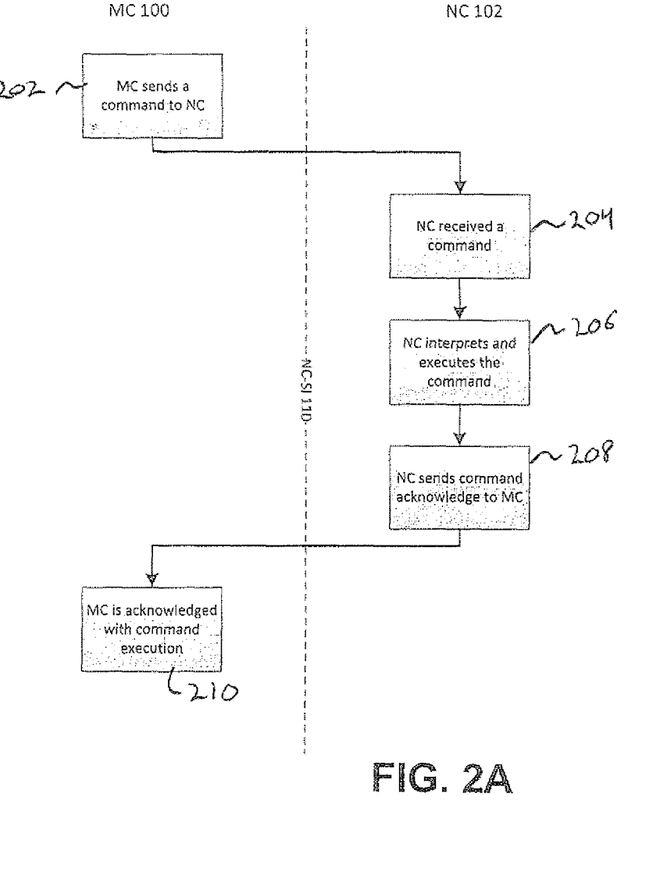
FIGS. 2A, 2B and 3 are a flow diagram of processes in accordance with embodiments of the disclosed subject matter.
Figure 2B:
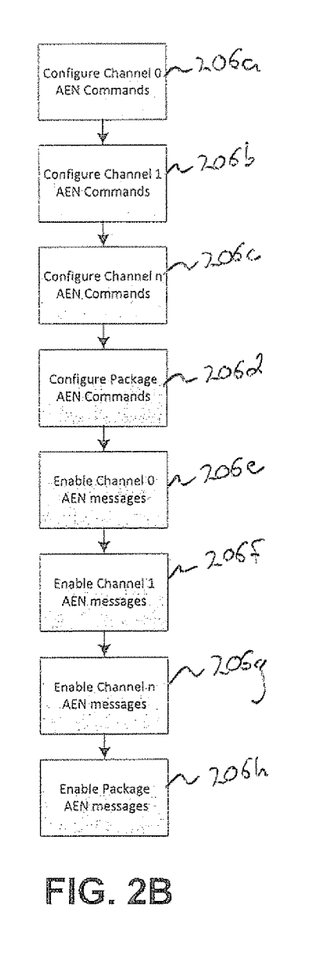
Figure 3:
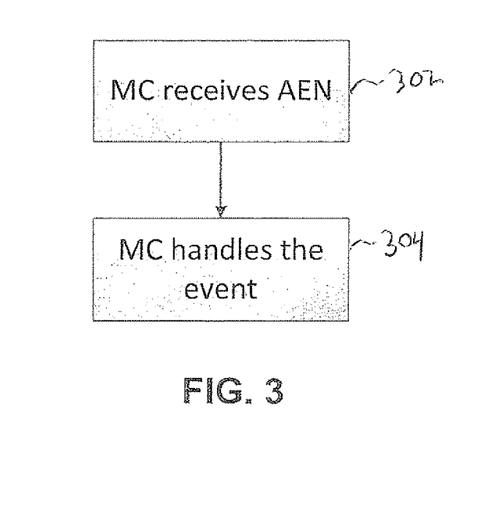

Attention is now directed to FIGS. 2A, 2B and 3, which show a flow diagram detailing a computer-implemented process in accordance with embodiments of the disclosed subject matter. Reference is also made to the tables of FIGS. 4A-4F and 5 The process and sub-processes of FIGS. 2A, 2B and 3 are computerized processes performed by the management controller 100, network controller 102 that are connected over the NCSI 110. The aforementioned processes and sub-processes are, for example, performed automatically and in real time.

Turning to FIG. 2A, a command processing flow, where at block 202, the master controller 100 sends a command, for example, "Set System AEN Controls" to a network controller 102a-102m, for example, network controller 102a, with the process repeated for all network controllers 102b-102m. The process detailed for network controller 102a is a representative process, which is repeated for network controllers 102b-102m. The command includes data for settings, which when received by the network controller 102a, will result in the configuration of the internal settings of the network controller 102a being in accordance with the settings of the command. The network controller 102a is such that the command is predetermined, as it was embedded or otherwise programmed into the network controller 102a, for example, network controller hardware or a processor of the network controller 102a. The command (e.g. predetermined command) is transmitted over the NCSI 110, where it is received by the network controller, at block 204.

The process moves to block 206, where the network controller 102a interprets and executes the command, as shown in detail in FIG. 2B, blocks 206a-206h, an initialization flow, to which attention is now directed. At blocks 206a-206d the channels and packages are configured, and at blocks 206a-206d and then enabled, at blocks 206e-206f.

At blocks 206a, 206b, 206c and 206d, control bits are set and message types are set. For example, the Command=0x12 and the Parameter=0x4.

The "Set System AEN Controls" is a command allowing the management controller 100 to control system specific AEN Messages of the NC 102. At blocks 206a, 206b and 206c, the "Set System AEN Controls" is addressed to the requisite channel, Channel 0 (block 206a), Channel 1 (block 206b) and Channel n (block 206c), for configuration of these channels. The management controller 100 sets the channel ID, Ch. ID=0x00, for Channel 0, shown in FIG. 4A, Ch. ID=0x01, for Channel 1, shown in FIG. 4B, for the channel related registers. At blocks 206a, 206b and 206c, the channels, Channel 0, Channel 1 and Channel n are configured. The configurations are shown in FIG. 4A for Channel 0, FIG. 4B for Channel 1, with Channel n configured similarly.

Similarly, this command is also addressed to the package. The management controller 100 configures the package AEN Commands, at block 206d, by setting the channel ID to Ch. ID=0x1F for package related registers, as shown in FIG. 4C.

Figure 4A:
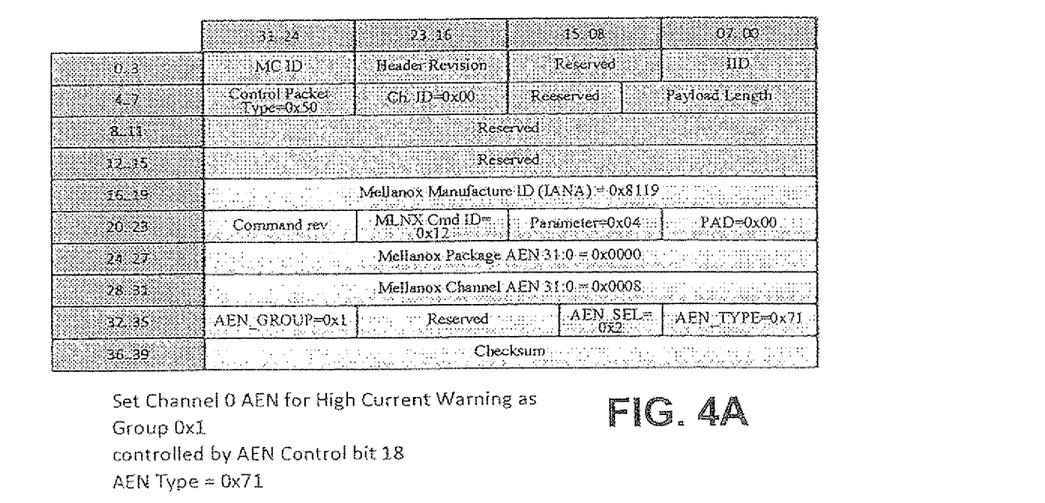
FIGS. 4A-4F are Tables associated with configuring and enabling channels and packages, and include all commands with filled fields.

As shown, for example, in FIG. 4A, various parameters are now described.

1. Channel AEN

In FIG. 4A for Channel 0, the System channel AEN of Bytes 28-31 "Mellanox Channel AEN 31:0=0x0008", is as follows:

Bits 6:0 are not set which implies that the corresponding events are not enabled.

Bit 7 is set which implies that the corresponding event of bit 7 is enabled. In this example this is a HIGHT CABLE CURRENT AEN.

Bits 31:8 are not set which implies that the corresponding events are not enabled.

Figure 4B:
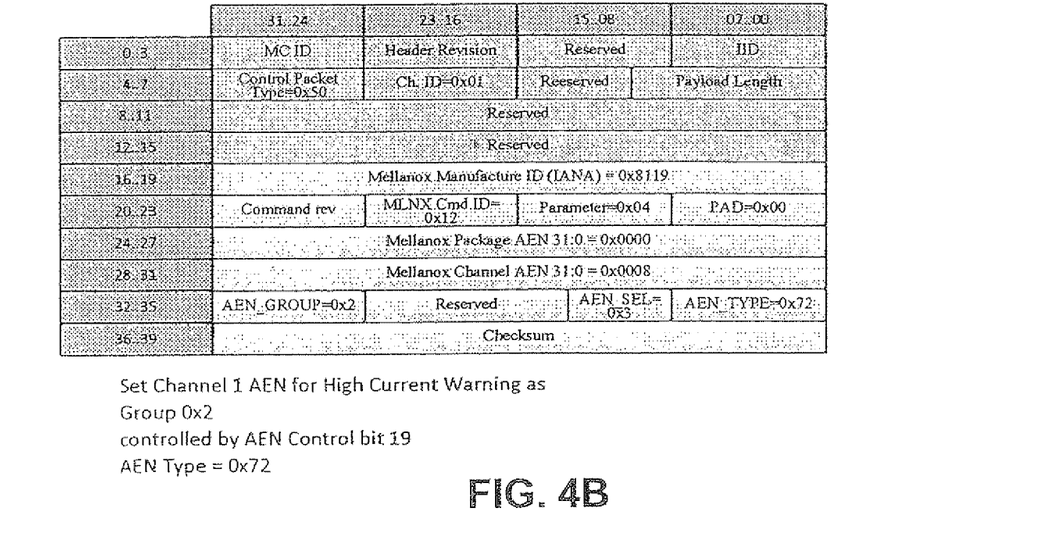
Figure 4C:
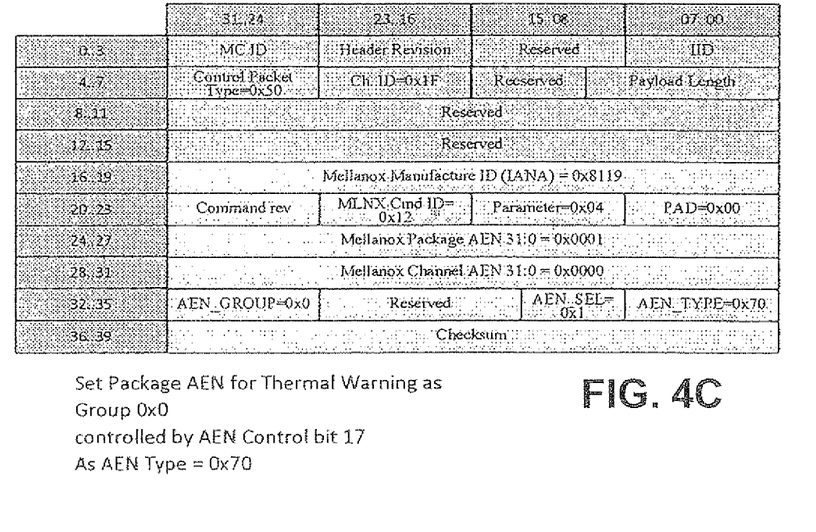

In FIG. 4B for Channel 1, the System channel AEN of Bytes 28-31 "Mellanox Channel AEN 31:0=0x0008", is as follows:

Bits 6:0 are not set which implies that the corresponding events are not enabled.

Bit 7 is set which implies that the corresponding event of bit 7 is enabled. In this example this is a HIGHT CABLE CURRENT AEN.

Bits 31:8 are not set which implies that the corresponding events are not enabled.

The Channel AEN controls are only updated to the selected channel when the Channel ID (Ch. ID) value is not 0x1F.

1.1. AEN_GROUP

This parameter allows support for multiple event groups. Each group can be configured separately. From FIGS. 4A and 4B, at Byte 32, the AEN_GROUP is located.

Bits 24 to 31 (which are located in byte 32) represent the field AEN_GROUP. This field is used to select the AEN Group to be configured. When multiple event groups are used, each group is configured separately. Each group can include a single or multiple events, as configured in "Mellanox Package AEN" and "Mellanox Channel AEN".

1.2. AEN_SEL

This field selects the control bit for enabling event notification messages. In particular, the field selects the AEN enable bit to be used by the NC-SI for the AEN Control command. From FIGS. 4A and 4B, at bytes 32 to 35, the AEN_SEL field is as follows.

Bits 8 to 11 represent the field AEN_SEL. This field is used to select the enable bit for the System AEN to be used in AEN Control Command of the NC-SI 110. The bit index to enable System AEN Messages is AEN_SEL+16 illustrated as follows:

0x0: Bit 16
0x1: Bit 17
0xF: Bit 31

In the example shown in FIG. 4A the value of AEN_SEL=0x2 which selects bit 18 as the enable control bit for the HIGH CABLE CURRENT AEN. This setting defines that when bit 18 of NC-SI AEN Control field as defined in NC-SI specification is set to 1, then HIGH CURRENT EVENT AEN of channel 0 is enabled. When bit 18 of NC-SI AEN Control field as defined in NC-SI specification is set to 0, then HIGH CURRENT EVENT AEN of channel 0 is disabled.

In the example shown in FIG. 4B the value of AEN_SEL=0x3 which selects bit 19 as the enable control bit for the HIGH CABLE CURRENT AEN. This setting defines that when bit 19 of NC-SI AEN Control field as defined in NC-SI specification is set to 1, then HIGH CURRENT EVENT AEN of channel 1 is enabled. When bit 19 of NC-SI AEN Control field as defined in NC-SI specification is set to 0, then HIGH CURRENT EVENT AEN of channel 1 is disabled.

1.3. AEN_TYPE

As shown in FIGS. 4A and 4B, this vector field selects the AEN type to be used when system AEN messages are sent to the management controller 100. Having a configurable type allows using a dedicated AEN Type for NC-SI 110 connected devices.

Bits 0 to 7 represent the field AEN_TYPE. This field sets the AEN type to be sent when the NC-SI 110 device issues any of the enabled System messages.

In the example shown in FIG. 4A the value of AEN_TYPE=0x71.

In the example shown in FIG. 4B the value of AEN_TYPE=0x72.

2. Package AEN

In FIG. 4C for the Package Bytes 24-27 "Mellanox Package AEN 31:0=0x0001", is as follows:

Bits 31:1 are RESERVED. RESERVED indicates that for any additional package-related event (once defined), a dedicated AEN enable bit will be assigned.

Bit 0 is named: Thermal AEN. For this Thermal AEN, a value of 0 is such that a Thermal AEN is disabled, while a value of 1 is such that a Thermal AEN is enabled.

The fields of AEN_GROUP, AEN_SELECT, and, AEN_TYPE are also applicable to Package AENs, e.g., 2.1. AEN_GROUP, 2.2. AEN_SELECT, and, 2.3 AEN_TYPE, as detailed above.

Figure 5:
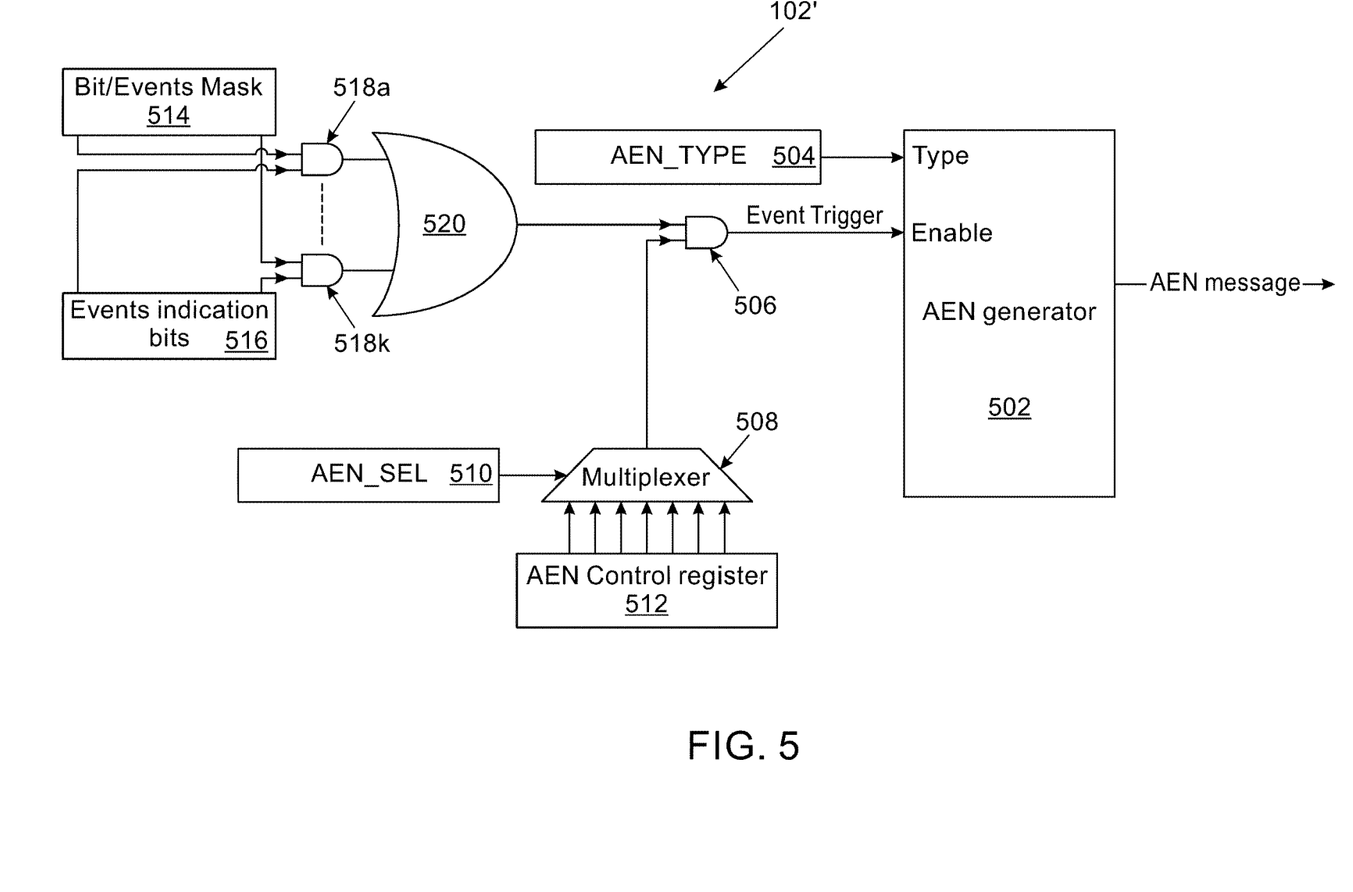
FIG. 5 is a diagram of the portion of the Network Controller which configures settings for the Network Controller; and, FIGS. 6 and 7 are Tables associated with GET commands.

Attention is now directed to FIG. 5, a diagram which shows the portion of the network controller, for example, a portion of the network device 102', which sets the configurations of the network controller 102a. This network device 102' and network controller 102a exemplary of all network controllers 102a-102m detailed herein. Specifically, the NC 102' configures the NC with a specific AEN Type (e.g., a configurable notification type) and sets it to be controlled by a specific AEN control enable bit, using a bit mask. There is an AEN generator 502, from which the AEN Command and messages are sent within the network controller 102a. The AEN_TYPE is selected from specific bits 504.

The enable bit for the configured AEN_TYPE message is through a logical AND gate 506, which triggers an event. A multiplexer 508 selects the specific control enable bit, from the AEN Control Register 512, using AEN_SEL (AEN_SEL Field) 510. The AEN Control Register is defined in DSP0222 standard to enable and disable AEN messages. This selected specific AEN control bit is then sent to the AND gate 506 which controls the enablement of sending the specific AEN_TYPE associated with the configured events.

A bit mask 514, formed of the fields Channel AEN, and Package AEN (32 bits in each field) selects event indication bits 516. The event indication bits are processed through AND gates 518a, 518k (k being the last of a series of AND gates) and then a logical OR gate 520, to reach the AND gate 506 for triggering. Any bit set on the bit mask 514 associates that particular event type, from the event indication bits 516 with the configurable AEN Type bits 504.

The process now resumes at blocks 206ea, 206f, 206g and 206h, where the channel (blocks 206e-206g) and package (block 206f) controls, configured in blocks 206a-206d, are now enabled. The NC 102a always receives and responds to "Set System AEN Controls", when the package ID matches and there are not any Checksum errors.

Figure 4D:
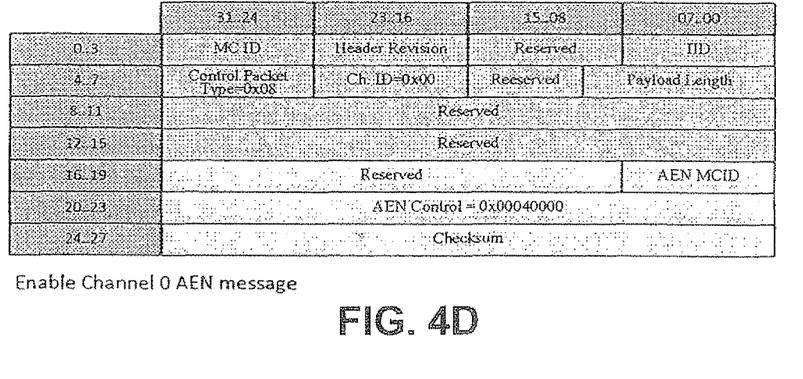
Figure 4E:
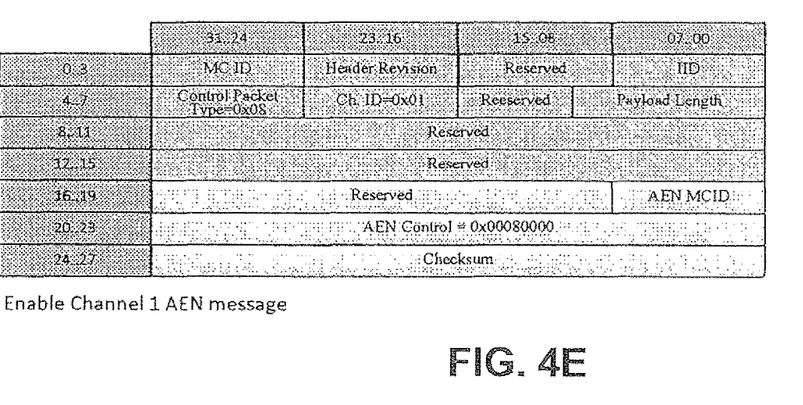
Figure 4F:
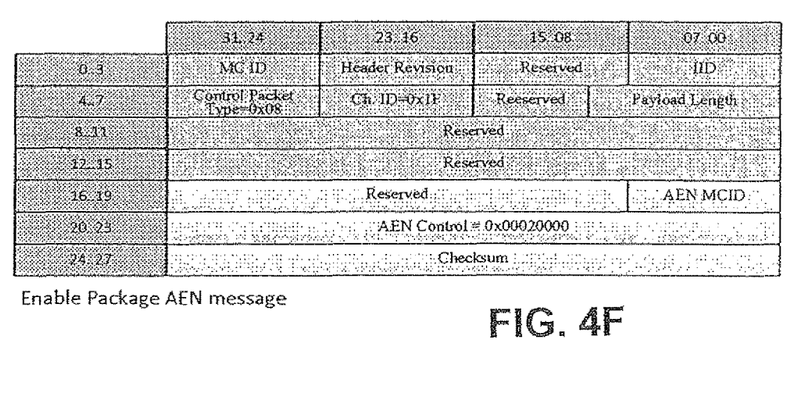

The "AEN Enable Command" of the DMTF DSP0222 Standard transmitted from the MC to an NC for enabling the configured AEN messages, is as follows: Channel 0, block 206e is shown in FIG. 4D, Channel 1, block 206f, is shown in FIG. 4E, channel n at block 206g, and Package 1 is shown in FIG. 4F at block 206h.

With the interpretation and execution of the command complete, the process moves to block 208, where the now-reconfigured NC 102a, transmits an acknowledgement of the command to the management controller 100. The process then moves to block 210, where the management controller 100 acknowledges that the NC has executed the command.

Attention is now directed to FIG. 3, which shows how events are handled, for example a thermal event. At block 302, the network controller (NC) 102a sends a message, e.g., an AEN notification of an event, e.g., the thermal event, which the management controller 100 receives. The process moves to block 304, where the management controller 100 handles the event. For example, with a thermal event, the management controller 100 will increase the cooling of the computer system to lower the temperature of the NC 102a.

Figure 6:
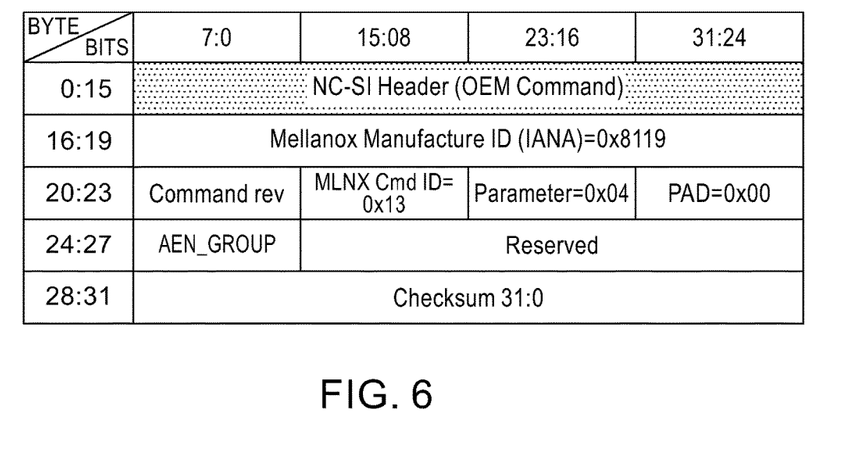

Turning back to the GET commands, for example, the command "Get System AEN Controls", in the control format of FIG. 6, to which attention is directed, the "Command=0x13" and the "Parameter=0x4". This "Get System AEN" command allows the management controller 100 to read system specific AEN messages of the network controllers 102a-102m. The "Get System AEN" command is addressed to the package and/or the specific channel of the specific network controller 102a-102m. The management controller 100 sets the channel ID to 0x1F for package related registers and to the correct channel ID for channel related registers. The network controllers 102a-102m always receive a response to the "Get System AEN Controls" command, when the package ID matches and there is not a checksum error.

When the "Get System AEN Controls" command is issued to the package, using channel ID=0x1F, the returned value of the channel AEN settings is always zero (0). When the "Get System AEN Controls" command was issued to the specific channel, using a channel ID other than 0x1F, the returned value of the package AEN settings is always zero (0). An exemplary "Get System Response Controls" format is shown in FIG. 7.

Figure 7:
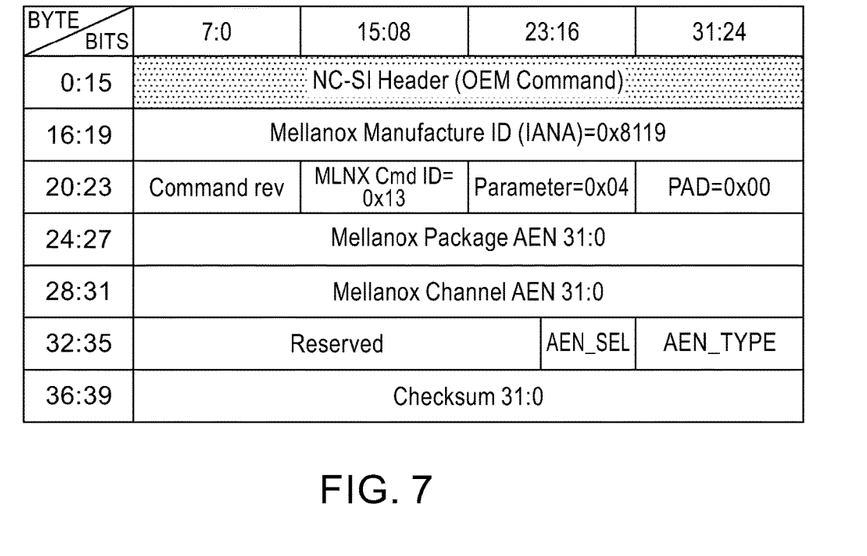

For FIG. 7, various parameters for the control fields are now described.

1. Channel AEN

In FIG. 4A for Channel 0, the System channel AEN of Bytes 28-31 "Mellanox Channel AEN 31:0=0x0008", is as follows:

Bits 6:0 are not set which implies that the corresponding events are not enabled.

Bit 7 is set which implies that the corresponding event of bit 7 is enabled. In this example this is a HIGH CABLE CURRENT AEN.

Bits 31:8 are not set which implies that the corresponding events are not enabled.

2. Package AEN

In FIG. 4C for the Package Bytes 24-27 "Mellanox Package AEN 31:0=0x0001", is as follows:

Bits 31:1 are RESERVED. RESERVED indicates that for any additional package-related event (once defined), a dedicated AEN enable bit will be assigned.

Bit 0 is named: Thermal AEN. For this Thermal AEN, a value of 0 is such that a Thermal AEN is disabled, while a value of 1 is such that a Thermal AEN is enabled.

The fields of 3. AEN_GROUP, 4. AEN_SELECT, and, 5. AEN_TYPE are in accordance with those for the Channel and Package AENs as detailed above.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A computerized method for configuring a network controller (NC) comprising:
   linking a network controller (NC) to a management controller (MC) through a Network Controller Sideband Interface (NC-SI);
   receiving by the network controller, a predetermined command from the management controller (MC) indicating an event type, a corresponding type number to be used for the event type and a corresponding bit location in a control word, to be used in enabling or disabling asynchronous event notifications (AENs) for the event type;
   the network controller responding to the predetermined command by configuring the NC with a correlation between the type number, the event type and the bit location; and
   sending system AEN messages from the NC to the MC regarding the event type, with the corresponding type number in a type field of the system AEN messages,
   wherein the sending of the system AEN messages is performed only when the corresponding bit location is enabled.

2. The computerized method of claim 1, wherein receiving the predetermined command indicating an event type comprises receiving a command indicating an event type by a bit mask.

3. The computerized method of claim 2, wherein the bit mask includes fields for a package AEN and a channel AEN associated with respective package and channels of the NC.

4. The computerized method of claim 1, wherein sending the system AEN messages comprises sending messages in accordance with the DMTF DSP0222 standard.

5. A network controller (NC) comprising:
   a network device configured for 1) recognizing a predetermined command from a management controller (MC) indicating an event type, a corresponding type number to be used for the event type and a corresponding bit location in a control word, to be used in enabling or disabling asynchronous event notifications (AENs) for the event type; and, 2) responding to the predetermined command by configuring the NC with a correlation between the type number, the event type and the bit location, and 3) sending system AEN messages from the NC to the MC regarding the event type, with the corresponding type number in a type field of the messages,
   wherein the sending of the system AEN messages is performed only when the corresponding bit location is enabled.

6. The Network Controller of claim 5, wherein the network device is selected from the group consisting of hardware, software, processors, storage media, and memory.

7. The Network Controller of claim 6, wherein the network device is configured to send the messages in accordance with the DMTF DSP0222 standard.

8. A management controller (MC), comprising:
   a processor configured to transmit to a network controller (NC) linked to the MC, a predetermined command indicating an event type, a corresponding type number to be used for the event type and a corresponding bit location in a control word, to be used in enabling or disabling asynchronous event notifications (AENs) for the event type, to transmit, to the NC, an AEN control command including an AEN control field in which the corresponding bit location indicates whether the NC is to transmit AENs for the event type, to receive, from the NC, AEN messages with the corresponding type number in a type field of the messages, and to interpret the AEN messages with the corresponding type number as relating to the event type.

\* \* \* \* \*